United States Patent
Humes

(10) Patent No.: US 6,721,577 B2
(45) Date of Patent: *Apr. 13, 2004

(54) LINKED LIST CALLING FEATURE WITHIN A TELECOMMUNICATIONS DEVICE

(75) Inventor: Michael Humes, Garland, TX (US)

(73) Assignee: Samsung Electronics Co., Ltd., Suwon (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/222,370

(22) Filed: Dec. 29, 1998

(65) Prior Publication Data

US 2002/0086710 A1 Jul. 4, 2002

(51) Int. Cl.⁷ .............................. H04B 1/38; H04M 1/00
(52) U.S. Cl. ....................... 455/564; 455/566; 455/445; 455/412.1
(58) Field of Search ................................. 455/564, 575, 455/445, 426, 422, 566, 550.1, 412, 575.6, 426.1, 426.2, 422.1, 412.1, 412.2, 413, 414.2, 419; 379/211, 356, 211.04, 211.02, 142.04, 355.05

(56) References Cited

U.S. PATENT DOCUMENTS

| | | | | |
|---|---|---|---|---|
| 5,371,779 A | * | 12/1994 | Kobayashi | 379/58 |
| 5,550,907 A | * | 8/1996 | Carlsen | 379/211.02 |
| 5,579,375 A | | 11/1996 | Ginter | 379/59 |
| 5,590,189 A | * | 12/1996 | Turnbull | 379/355.05 |
| 5,600,704 A | * | 2/1997 | Ahlberg et al. | 455/445 |
| 5,802,160 A | * | 9/1998 | Kugell et al. | 379/211.04 |
| 5,987,408 A | * | 11/1999 | Gupta | 704/231 |
| 6,125,287 A | * | 9/2000 | Cushman | 455/566 |
| 6,188,888 B1 | * | 2/2001 | Bartle et al. | 455/417 |
| 6,223,057 B1 | * | 4/2001 | Sone | 455/564 |
| 6,223,058 B1 | * | 4/2001 | Sudo et al. | 455/564 |
| 6,226,367 B1 | * | 5/2001 | Smith | 379/142.04 |

* cited by examiner

*Primary Examiner*—Nay Maung
*Assistant Examiner*—John J Lee

(57) ABSTRACT

A number of associated directory numbers are sequentially correlated into a link list and stored within a telecommunications device, such as a mobile station. In response to a user instruction or pre-determined call setup results, the telecommunications device retrieves a second directory number from the correlated link list and originates another outgoing call connection therewith. As an illustration, the user may provide such an instruction by pressing the volume-up or volume-down key. Alternatively, the mobile station may automatically retrieve and originate a new outgoing call connection using the next directory number from the link list in response to a busy signal from the pending call connection. With repeated detection of such instructions or conditions, the mobile station sequentially and individually retrieves the linked directory numbers and automatically originates outgoing call connections without the user having to separately and inconveniently entering the associated directory numbers.

14 Claims, 5 Drawing Sheets

LINKED LIST CALLING FEATURE WITHIN A TELECOMMUNICATIONS DEVICE

BACKGROUND OF THE INVENTION

1. Technical Field of the Invention

The present invention relates to mobile telecommunications systems and, in particular, to the use of a linked list of directory numbers within a telecommunications device for originating outgoing calls.

2. Description of Related Art

In recent years, the use of mobile communications has increased dramatically due to the obvious conveniences and benefits associated with such use, as well as the increased availability and affordability associated with mobile radio service. In addition to the existing wire-line or plain old telephone service (POTS) line numbers, a typical telecommunications user is thereby associated with, for example, a cellular or Personal Communication System (PCS) number, a home number, an office number, a pager, and/or voicemail number. Accordingly, a caller may have to originate a number of different call connections to successfully establish a speech connection with a particular called party subscriber. As an illustration, a caller may have to first dial a particular called party subscriber's office directory number to determine that the line is not being answered. In response thereto, the calling party subscriber may then have to originate a call connection towards the same called party subscriber via his or her mobile or PCS directory number. In response to an announcement message indicating that the mobile station is either "turned off" or "traveling outside of the coverage area", the calling party subscriber may then have to dial the associated home directory number. Being told that the called party subscriber is unavailable or being answered by an answering machine, the caller may then have to lastly dial the pager/voice-mail number associated with the called party subscriber. As exhaustively illustrated above, a caller may have to repeatedly and inconveniently memorize and dial a number of different telephone numbers all associated with the same called party in an attempt to establish a call connection therebetween.

Even with the introduction of internal phone books, voice dialing, and speed dialing capabilities within a telecommunications device, such as a mobile station, a caller using the device has to inconveniently search for and dial associated directory numbers. Likewise, a caller has to assign and memorize different speed dialing access codes or voice activation means for each of the directory numbers representing a particular called party subscriber. Furthermore, as more and more users are utilizing their mobile service while driving, searching through the internal phone directory and viewing and selecting the desired information via a relatively small display unit could be cumbersome and dangerous.

In view of the foregoing, it would be desirable to provide a method and apparatus for overcoming the above-identified deficiencies. More particularly, it would be desirable to provide a method and apparatus for originating multiple call connections without having to separately identify or enter associated directory numbers.

SUMMARY OF THE INVENTION

The present invention provides a method and apparatus for originating outgoing call connections within a telecommunications device. A telecommunications device, such as a mobile station, stores a plurality of directory numbers wherein some of said plurality of directory numbers are sequentially correlated into a link list. As an embodiment, a first directory number stored within the mobile station is associated with a pointer for correlating with a second directory number. The second directory number may further be associated with a pointer for correlating with a third directory number. Accordingly, an indefinite number of directory numbers can be sequentially correlated and similarly maintained in a link list.

A first outgoing call connection is originated using a first directory number associated with a particular sequential link list of directory numbers. Thereafter, in response to detecting a predetermined condition or user instruction, the mobile station discontinues the first outgoing call connection and retrieves a second directory number from the associated link list. The mobile station then originates a new outgoing call connection with the newly retrieved directory number as the called party number (CdPn). In response to subsequent detection of the predetermined condition, the processor sequentially originates related outgoing call connections using the rest of the linked directory numbers in a similar manner. In one embodiment, such a predetermined condition is detected when a particular user key associated with the mobile station is pressed. In another embodiment, the predetermined condition is detected when a particular call setup result is generated from the originated outgoing connection request.

In one aspect, the present invention provides a system for storing a sequential link list of directory numbers within a mobile station and sequentially originating multiple outgoing call connections using the stored directory numbers;

In another aspect, the present invention provides a system for sequentially originating a plurality of outgoing call connections within a mobile station without having to separately enter or select the associated directory numbers;

In yet another aspect, the present invention provides a system for storing a sequential link list of directory numbers within a mobile station and for detecting a predetermined condition within said mobile station for effectuating a sequence of outgoing call connections; and In a further aspect, the present invention provides a method for storing a sequentially correlated link list of directory numbers within a mobile station and for sequentially originating outgoing call connections using said directory numbers until a desired call connection is established.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
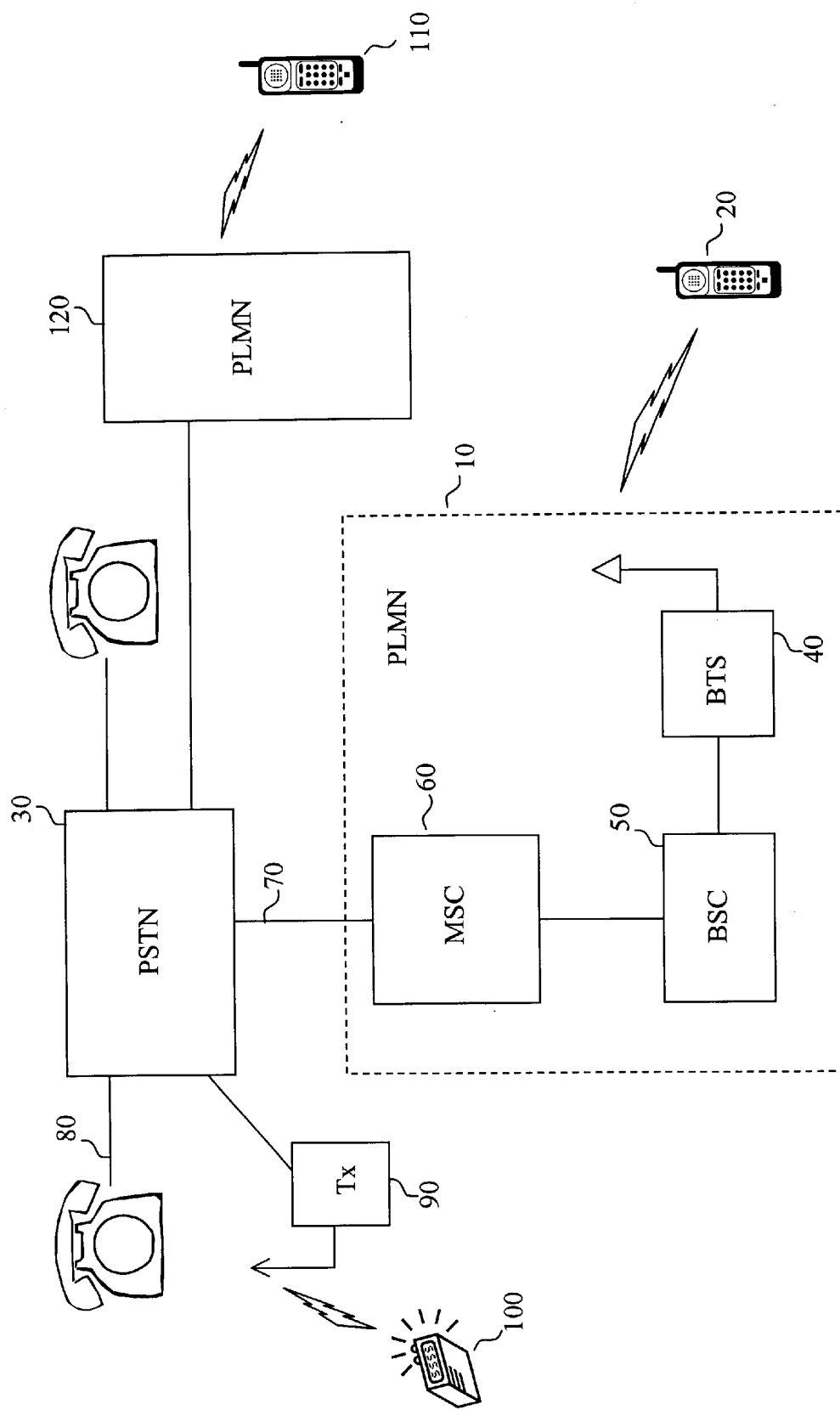
FIG. 1 is a diagram illustrating a public land mobile network (PLMN) interfacing with a mobile station (MS) and a public switched telephone network (PSTN)

FIG. 1 is a diagram illustrating a public land mobile network (PLMN) 10 interfacing with a mobile station (MS) 20 and a public switched telephone network (PSTN) 30. In a conventional mobile telecommunications network, a base transceiver station (BTS) 40 providing radio coverage over a particular geographic area, also known as a cell area, receives an instruction from the mobile station 20 located therein to originate an outgoing call connection. The serving BTS 40 allocates an available traffic channel and forwards the called party directory number received from the requesting mobile station 20 to an associated base station controller (BSC) 50. The BSC 50, in turn, forwards the received outgoing call instruction to an associated mobile switching center (MSC) 60. The MSC 60 performs a digit analysis to analyze the received directory number and establishes a trunk connection 70 with an appropriate PSTN 30. In case the dialed called party number represents one of the terminals associated with the PSTN 30, an appropriate call connection is established thereto. As an illustration, in case the dialed directory number is for a wire-line subscriber terminal, the PSTN 30 establishes a conventional wire-line connection with an appropriate wire-line terminal 80. In case the dialed directory number is associated with a pager, the PSTN 30 may forward the number to a paging system 90 to page an associated pager 100. Furthermore, in response to a determination that the dialed directory number represents another mobile station 110, the PSTN 30 forwards the call connection to an associated PLMN 120. A serving BTS (not shown in FIG. 1) associated with the PLMN 120 then allocates necessary radio resources and effectuates a speech connection between the calling mobile station 20 and the called mobile station 110.

The illustrated wire-terminal 80, mobile station 110, pager 100, as well as any number of telecommunications devices and associated directory numbers may all be assigned to a particular subscriber. Accordingly, in order to establish a call connection with that particular subscriber, a calling party subscriber may have to separately and inconveniently dial or enter a number of different directory numbers.

Figure 2:
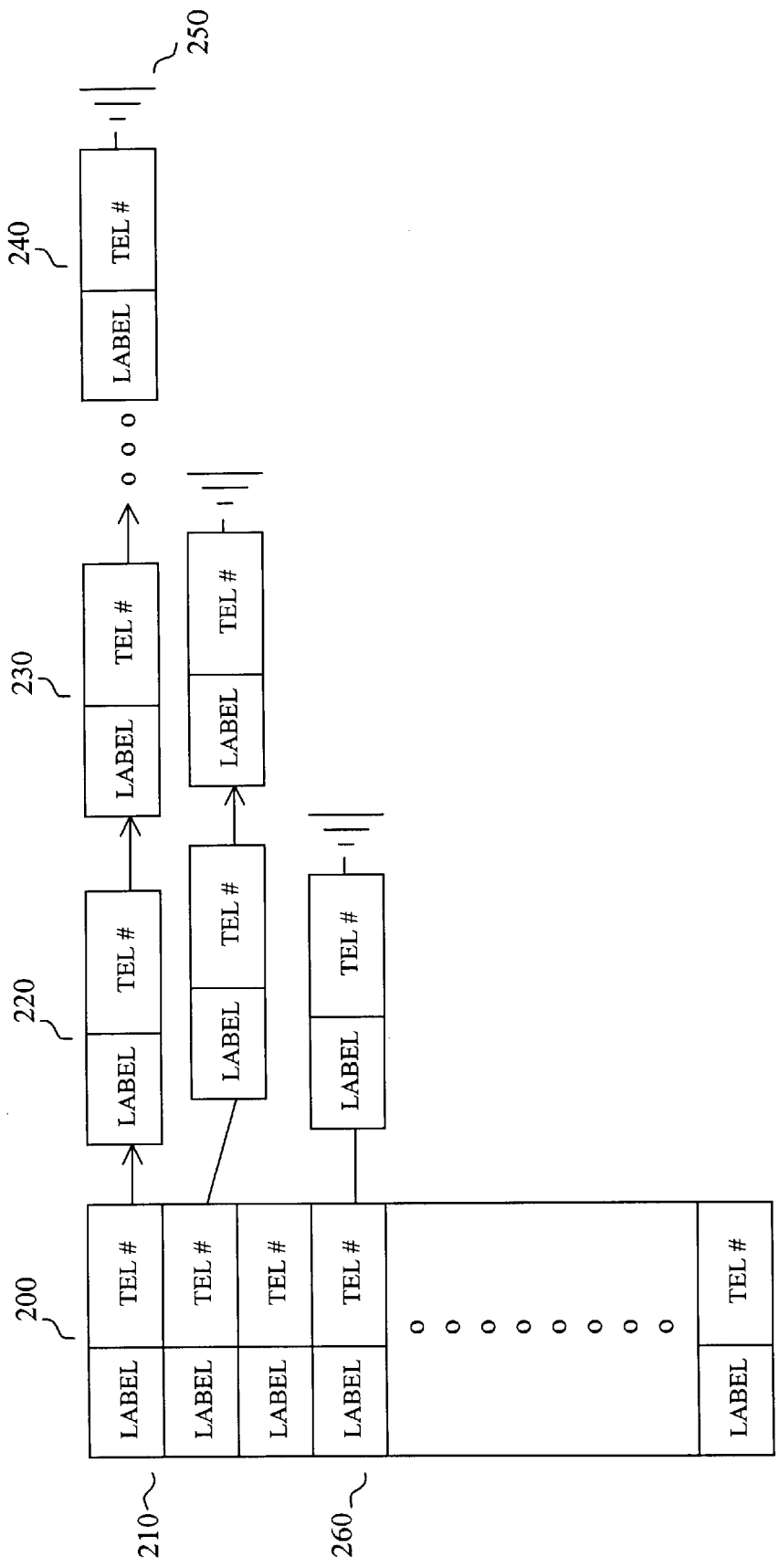
FIG. 2 is a block diagram of data structure storing a link list of directory numbers in accordance with the teachings of the present invention.

FIG. 2 is a block diagram of data structure storing a link list of directory numbers in accordance with the teachings of the present invention. A memory storage device, such as a random access memory (RAM) register unit associated with a mobile station, stores a number of directory numbers 200 as illustrated. In accordance with the teachings of the present invention, a first directory number 210 stored within the memory storage device is further correlated with a second directory number 220. As an illustration, a first register storing the first directory number 210 further stores a next-register-address pointer to identify a second register storing the second directory number 220. The concept of storing an address pointer within a first register for correlating with another register is also known in the computer industry as a "link list". By "linking" one unit of information or memory location with another unit of information or memory location, an indeterminate number of units can be sequentially linked or correlated with each other. As illustrated in FIG. 2, the first register containing the first directory number 210 further contains an address pointer for identifying a second register containing the second directory number 220. The second register, in turn, points to a third register containing a third directory number 230. The last register 240 in the link list points to a "NIL" value 250 indicating the end of the list. As a result, an indeterminate number of registers, each containing its own directory number and associated identification label, can be sequentially linked or correlated as shown. Likewise, another directory entry 260 within the storage device 200 may be associated with another link list in a similar manner.

In accordance with the teachings of the present invention, the first directory number may be associated with a particular subscriber's office phone. The second directory number may be associated with his or her mobile phone, the third directory number may be associated with his or her home phone, and the last directory number may be associated with his or her pager or voice-mail system. As a result, all of the directory numbers representing a particular user are then sequentially correlated, stored and maintained in a link list fashion.

Figure 3:
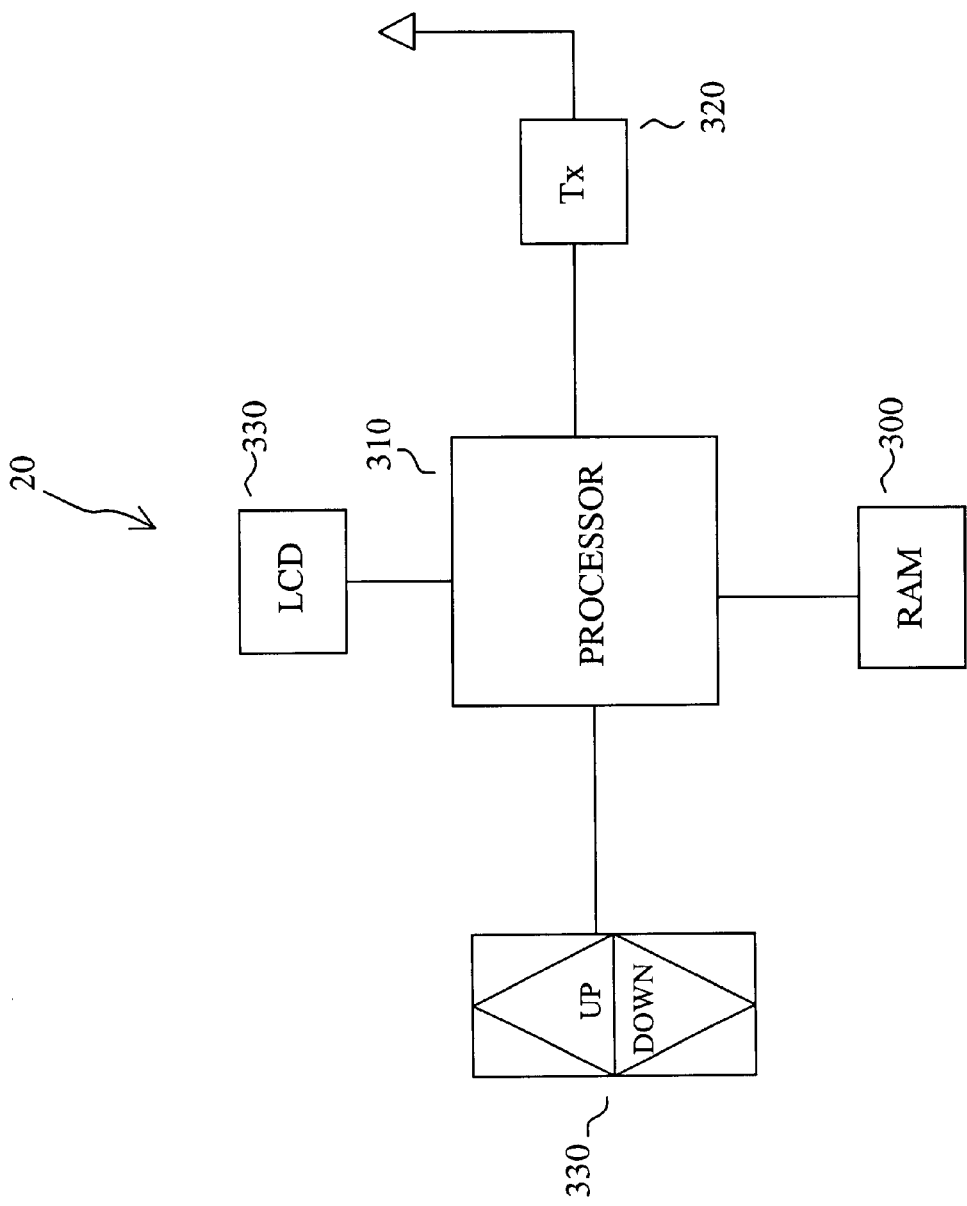
FIG. 3 is a block diagram of a mobile station (MS) in accordance with the teachings of the present invention.

FIG. 3 is a block diagram of a mobile station (MS) 20 in accordance with the teachings of the present invention. A storage device 300 storing the link lists as described in FIG. 2 is associated with a main processor 310 within the mobile station 20. The processor 310 is further associated with a transmitter (TX) 320 as well as a receiver (Rx, not shown in FIG. 3) for communicating radio signals with a serving BTS (refer to BTS 40 in FIG. 1). The processor 310 is also typically coupled to a display unit 330, such as a liquid crystal display (LCD) unit, for displaying user instructions and call status as well subscriber stored information. The processor 310 is further coupled to volume up and down keys 330 or menu scroll keys as illustrated. It is understood that FIG. 3 does not include all the circuitry or components required to effectuate a mobile station, but instead is a block diagram to disclose the fundamentals of an exemplary embodiment of the present invention understandable by one of ordinary skill in the art.

The processor 310 initially retrieves a particular directory number from the associated storage device 300 and communicates with the Tx 320 to originate an outgoing call connection. Alternatively, the processor 310 may receive the directory number directly from the user or other sources. The processor then determines whether the dialed or retrieved directory number is associated with a particular link list of directory numbers already stored in the storage device 300. In response to a determination that the directory number is not associated with a particular link list of directory numbers, the mobile station handles the rest of the call connection in a conventional manner.

On the other hand, in response to an affirmative determination, the mobile station identifies the link list of directory numbers associated with the dialed or retrieved directory number and enables a link list calling feature in accordance with the teachings of the present invention. The processor 310 thereafter continuously monitors the call and the user input to determine whether the link-list calling feature should be invoked. In response to the processor 310 detecting a predetermined condition or instruction, the mobile station discontinues the pending or requested outgoing call connection and retrieves the next directory number from the determined link list of directory numbers. The processor 310 then originates a new outgoing call connection using the newly retrieved directory number as the called party directory number. In one embodiment, the processor 310 detects such condition when the user presses the up or down arrow key 330 to instruct the mobile station to discontinue the pending outgoing call request and to originate a new outgoing call connection using another directory number from the determined link list. In a similar manner, any key, button, or function coupled to a mobile station can be selected to enable the user to provide such an instruction. As another embodiment, the processor 310 automatically makes such detection when the requested outgoing call connection fails. The processor detects such a failure when a busy or congestion signal is received from the requested call connection. The mobile station then automatically retrieves the next directory number associated with that particular called party subscriber and originate a new outgoing call connection thereto.

Figure 4:
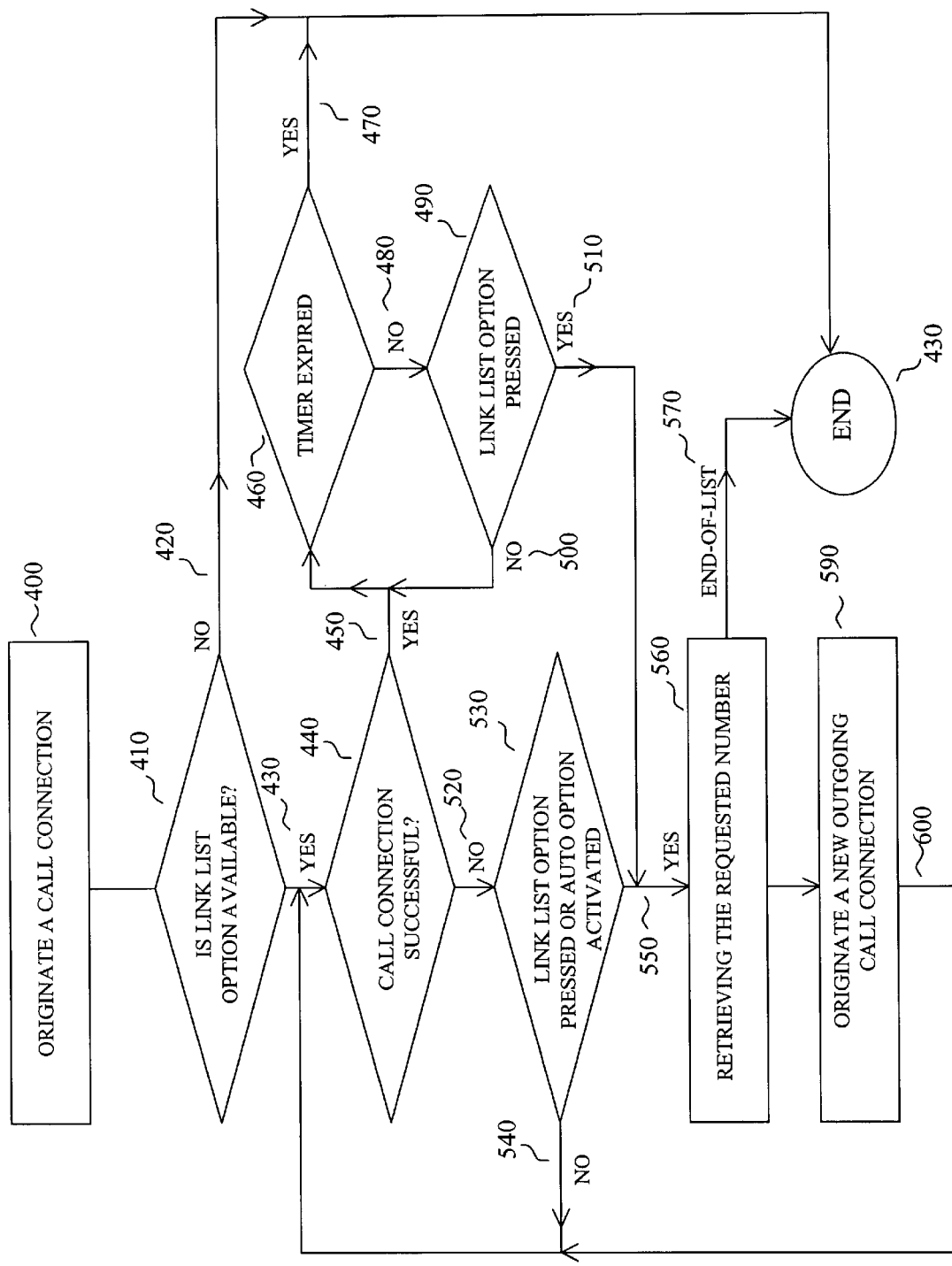
FIG. 4 is a flow chart illustrating the steps taken in order to effectuate a link list calling feature within a mobile station (MS)

FIG. 4 is a flow chart illustrating the steps taken in order to effectuate the link list calling feature within a mobile station (MS). An outgoing call connection is originated by a mobile station in a conventional manner in step 400. Such a manner may include directly dialing a specific directory number, selecting a particular directory number from a stored phone list, or specifying a specific directory number via speed code or voice activation code. The processor associated with the mobile station thereafter determines whether the specified directory number is correlated with a particular link list of directory numbers in step 410. Such a determination may be made by searching and comparing the dialed directory number with the previously stored link list of directory numbers. If the dialed directory number is not one of the directory numbers associated with a particular link list of directory numbers (No Decision Link 420), the mobile station handles the rest of the pending call request in a conventional manner (step 430).

On the other hand, if the dialed directory number is associated with a particular link list of directory numbers (Yes Decision Link 430), the processor thereby determines whether the requested outgoing call connection has been successfully established in step 440. If the call connection has not yet been established (No Link 520), the processor determines whether a predetermined condition or user instruction associated with the link-list-calling feature has been detected in step 530. The processor may recognize such a condition when the user presses a pre-assigned key or button. Alternatively, the processor may also make such a determination when a busy signal is received from the requested call connection. In response to a determination that the pre-determined condition has been detected, the processor retrieves the indicated directory number from the determined link list of directory numbers in step 560. As an illustration, if the user presses the volume-up arrow key, the processor retrieves the next directory number correlated within the determined link list of directory numbers. Similarly, if the user presses the volume-down arrow key, the processor retrieves the previous directory number associated thereto. After the appropriate directory number is retrieved from the storage device, the processor discontinues the pending outgoing call connection and originates a new outgoing call connection with the newly retrieved directory number as the called party subscriber number in step 590. After the new outgoing call connection has been originated, the processor returns to the original state wherein the call setup status is monitored in step 440.

While attempting to retrieve the next or previous directory number associated within the specified link list, the processor may determine that there exists no additional directory number within that list. In response thereto, the processor may terminate the link list calling feature (decision link 570) and handle the pending call connection in a conventional manner (step 430). Alternatively, the processor may provide an instruction or indication to the user indicating the end of the list status and request further instruction therefrom. Such an instruction may be provided via a beep or display on the attached display unit.

Referring back to step 440, in response to a determination that the requested call connection has been successfully established (Yes Decision Link 450), the processor activates a timer for a specific period for the user to activate the link list calling feature (although the timer may alternatively be activated by the origination of a call connection in step 400, described above). In other words, the user has a predetermined amount of time to instruct the mobile station to discontinue the existing call connection and to originate a new outgoing call connection using a different directory number from the associated link list of directory numbers. Accordingly, the processor determines whether the specified time period has expired in step 460. If the call connection has already been established for the predetermined duration (Yes Decision Link 470), the processor disables the link list calling feature and handles the pending call connection in a conventional manner (End Step 430). If the timer has yet to expire (No Decision Link 480), the processor determines whether the predetermined user instruction has been detected in step 490. In response to an affirmative determination that the instruction has been provided by the user (Yes Decision Link 510), the processor discontinues the existing call connection and retrieves the instructed directory number in step 560 and as fully described above. The processor thereafter originates a new outgoing call connection in step 600.

If the user instruction has not been detected (No Decision Link 500), the processor repeats the test by rechecking the expiration status of the timer in step 460. As a result, the processor performs the "loop test" until the timer expires or the user instruction is detected.

Figure 5:
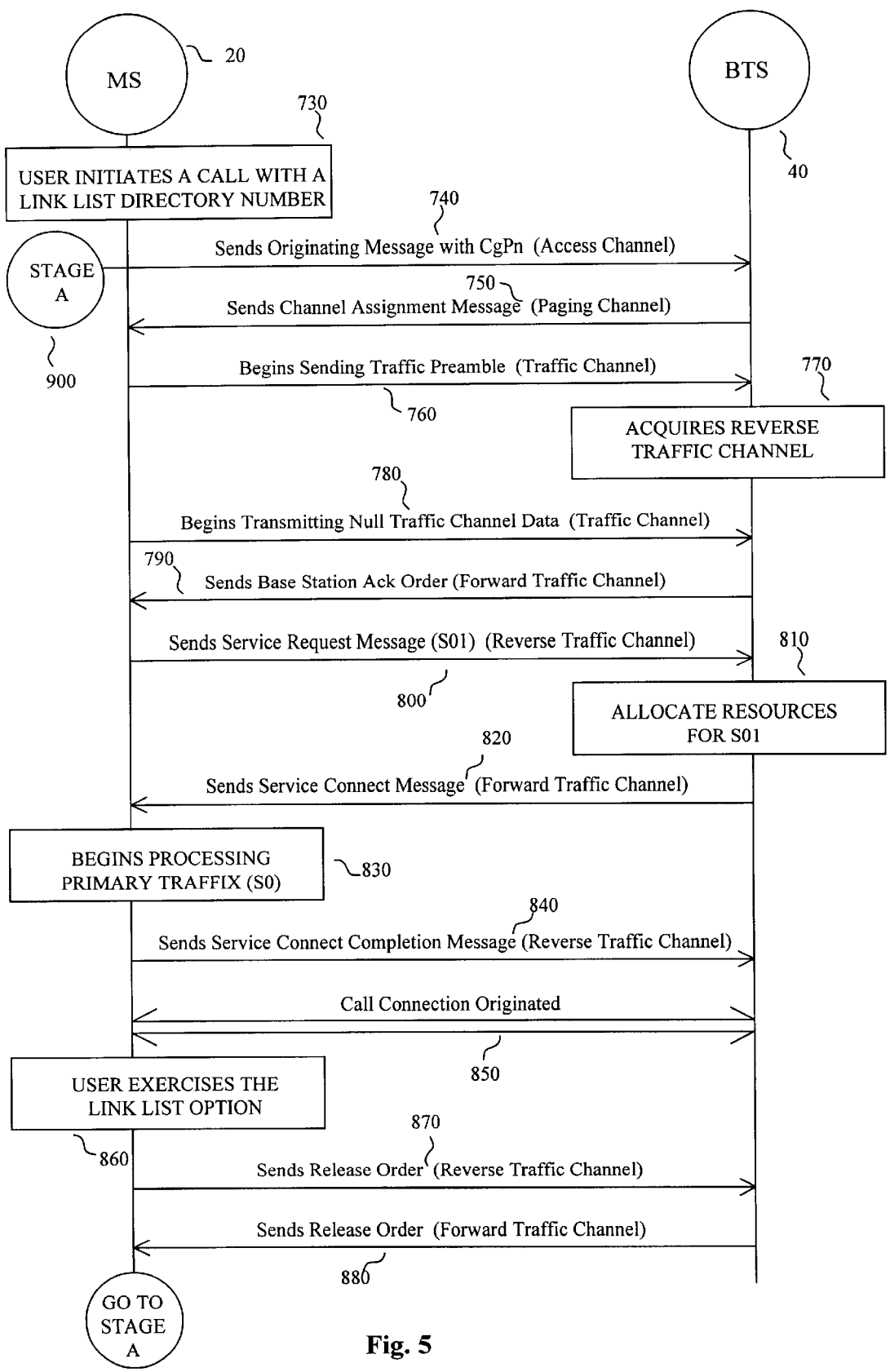
FIG. 5 is a signal sequence chart illustrating the sequences of signals communicated between a mobile station (MS) and a serving base transceiver station (BTS) for effectuating the link list calling feature.

FIG. 5 is a signal sequence chart illustrating the sequences of signals communicated between a mobile station (MS) 20 and a serving base transceiver station (BTS) 40 to effectuate the link list calling feature. The mobile station 20 attempts to originate an outgoing call connection using a directory number associated with a particular link list of directory numbers as the called party subscriber number (also known as the "destination number" or "B-number") at step 730. The mobile station 20 first sends an Originating Message 740 with the called party number (CdPn) over an Access Channel to the serving BTS 40. The serving BTS 40, in response, sends a Channel Assignment Message 750 over a Paging Channel back to the mobile station 40 informing the mobile station of the allocated traffic channel. After having allocated a forward traffic channel to initiate a call connection, the mobile station 20 then begins sending Traffic Preamble data 760 over a reverse traffic channel. By receiving the transmitted Traffic Preamble data, the serving BTS thereafter identifies and acquires the utilized reverse traffic channel 770. The mobile station 20 then transmits null traffic channel data 780 over the reverse traffic channel. The serving BTS 40, in turn, acknowledges by sending a Base Station Ack Order 790 over the allocated forward traffic channel. After the acknowledgment has been received, the mobile station sends a Service Request Message (SOI) 800 over the reverse traffic channel. The serving BTS 40 thereafter allocates the necessary resources for the requested service at 810. Upon completion, the serving BTS 40 transmits a Service Connect Message 820 over the forward traffic channel. The mobile station in response begins processing the primary traffic at 830 and acknowledges by returning a Service Connect Completion message 840 to the serving BTS 40. As a result, a call connection 850 has been originated between the mobile station 20 and the serving BTS 40.

In accordance with the teachings of the present invention, the mobile station thereafter determines that the link-listcalling feature needs to be invoked (as fully described in FIG. 4) at 860. The mobile station accordingly retrieves the indicated directory number from a particular link list of directory numbers. In further response to such a determination, the mobile station sends a Release Order message 870 over the reverse traffic channel to instruct the serving BTS 40 to release all allocated resources. The serving BTS 40 accordingly releases the allocated resources and acknowledges the request by returning a Release Order 880 to the mobile station 20. The mobile station 20 thereafter goes back to a Stage A 900 wherein the above described signal sequences for originating an outgoing call connection are repeated with the newly retrieved directory number as the new called party number. As a result, without modifying the existing over-the-air interfaces or associated radio messages, the mobile station can provide the user with the link list calling feature in accordance with the teachings of the present invention.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A mobile telecommunications device comprising:
   a register for storing a plurality of directory numbers for a single called party subscriber wherein said plurality of directory numbers are sequentially linked amongst each other;
   a processor far originating a first call connection with a first directory number of said called party subscriber associated with said sequentially linked directory numbers stored in said register; and
   a detector associated with said processor for detecting an instruction, responsive to a failure to successfully establish the first call connection, to originate a second call connection using a second directory number of said called party subscriber associated with said sequentially linked directory numbers,
   wherein said processor, in response to said detection, originates a second call connection to said called party subscriber with said second directory number.

2. The mobile telecommunications device of claim 1 wherein said register further stores an identification label for each of said plurality of directory numbers.

3. The mobile telecommunications device of claim 1 wherein said detector is disabled when said originated call connection is successfully established.

4. The mobile telecommunications device of claim 1 further comprising a timing device associated with said processor, said timing device triggered by successful establishment of a call connection.

5. The mobile telecommunications device of claim 4 wherein said processor ignores said instruction detected by said detector after said originated call connection is successfully established and said timer device has reached a predetermined value.

6. The mobile telecommunications device of claim 1 wherein said detector detects said instruction to originate said second call connection when said originated first call connection has failed.

7. A mobile station for establishing a communications link with a radio base station within a mobile telecommunications system comprising;
   means for storing a plurality of directory numbers for a called party subscriber;
   means for sequentially associating some of said plurality of directory numbers of said called party subscriber into a sequential link list;
   means for originating a call connection with a first directory number of said called party subscriber associated with said sequential link list;
   means for detecting a predetermined condition to disconnect said originated call connection; and
   means for originating a new call connection with a second directory number of said called party subscriber associated with said sequential link list in response to said disconnection.

8. The mobile station of claim 7 further comprising a timer device wherein said means for detecting is disabled after said timer device has reached a predetermined value after establishing said call connection.

9. The mobile station of claim 7 wherein said means for detecting is disabled after said call connection has been successfully established.

10. The mobile station of claim 7 wherein said predetermined condition includes a busy signal from said originated call connection.

11. A method for establishing a call connection within a mobile telecommunications system comprising the steps of:
    storing a plurality of directory numbers for a called party subscriber within a mobile telecommunications device;
    correlating said plurality of directory numbers into a sequential inked list of directory numbers;
    originating a first call connection with a first directory number of said called party subscriber associated with said sequential linked list;
    detecting a predetermined condition to initiate a new call connection;
    discontinuing said first call connection in response to said detection; and originating a second call connection with a second directory number of said called party subscriber associated with said sequential linked list in response to said detection.

12. The method of claim 11 further comprising the step of ignoring said step of detection after said originated call connection has been successfully established.

13. The method of claim 11 further comprising the steps of:
    determining that said first call connection has been successfully established;
    effectuating a timer for a predetermined expiration time period; and
    in response to said step of detecting said predetermined condition, ignoring said detection if said timer has expired.

14. The method of claim 11 wherein said step of detecting said predetermined condition comprises the step of detecting a busy signal from said originated call connection.

* * * * *